United States Patent
Bhagavath et al.

(10) Patent No.: US 6,556,562 B1
(45) Date of Patent: Apr. 29, 2003

(54) SYSTEM TO PROVIDE LIFELINE IP TELEPHONY SERVICE ON CABLE ACCESS NETWORKS

(75) Inventors: Vijay K. Bhagavath, Lincroft, NJ (US); Joseph Thomas O'Neil, Staten Island, NY (US); Roy Philip Weber, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/407,916

(22) Filed: Sep. 29, 1999

(51) Int. Cl.$^7$ .......................... H04L 12/66; H04N 7/173
(52) U.S. Cl. .......................... 370/352; 725/111
(58) Field of Search ...................... 370/352, 356, 370/216; 375/222; 725/111, 118, 127, 128, 130

(56) References Cited

U.S. PATENT DOCUMENTS

| | | | |
|---|---|---|---|
| 3,860,748 A | | 1/1975 | Everhart et al. |
| 4,176,320 A | | 11/1979 | Leshkowitz |
| 4,362,951 A | | 12/1982 | Turner et al. |
| 4,412,245 A | | 10/1983 | Kwok |
| 4,418,424 A | * | 11/1983 | Kawamoto et al. ......... 725/149 |
| 4,560,841 A | | 12/1985 | Pierrel |
| 5,355,401 A | | 10/1994 | Skinner |
| 5,457,414 A | | 10/1995 | Inglis et al. |
| 5,469,495 A | * | 11/1995 | Beveridge .................. 379/56.2 |
| 5,619,252 A | | 4/1997 | Nakano |
| 5,747,888 A | | 5/1998 | Zilberberg |
| 5,845,190 A | * | 12/1998 | Bushue et al. .............. 725/130 |
| 5,913,003 A | | 6/1999 | Arroyo et al. |
| 6,028,916 A | * | 2/2000 | Beveridge .................. 379/56.2 |
| 6,285,856 B1 | * | 9/2001 | Aguayo et al. ................. 725/1 |

OTHER PUBLICATIONS

European Search Report dated Jan. 18, 2001 as to European Patent Application No. EP00120187.

* cited by examiner

Primary Examiner—Chau Nguyen
Assistant Examiner—Nhat Do

(57) ABSTRACT

A cable access network includes a cable trunk amplifier connected over a coaxial cable to A plurality of cable data modems to provide backup power to the cable modem during power outages experienced by either the trunk amplifier or the modems, thereby insuring uninterruptible IP telephone service. The trunk amplifier applies a DC voltage across the conductors of the coaxial cable. An AC/DC power converter and regulator and also a backup battery are sources of power for the DC voltage applied to the coaxial cable. A power outage sensor selectively connects either the AC/DC power converter and regulator or, alternately, the backup battery to the cable, depending on whether there is an outage sensed at the trunk amplifier. Each cable data modem connected to the trunk amplifier is partitioned into IP voice circuits and other circuits not contributing to the IP voice function. The other circuits include, for example, video/audio receiver circuits and IP data transceiver circuits. The IP voice circuits are connected to the subscriber's telephone hand set. The cable data modem applies a DC voltage to the IP voice circuits and the subscriber's telephone hand set. An AC/DC power converter and regulator in the modem and also the DC voltage from the coaxial cable are sources of power for the DC voltage applied to the IP voice circuits. A power outage sensor selectively connects the IP voice circuits to either the AC/DC power converter and regulator in the modem or, alternately, the DC voltage from the coaxial cable, depending on whether there is an outage sensed at the cable data modem. The other circuits such as the video/audio receiver circuits and IP data transceiver circuits are powered only by the AC/DC power converter and regulator in the cable data modem. In this manner, if there is a general power outage affecting both the trunk amplifier and many of the cable data modems connected to it, the power to be supplied by the backup battery at the trunk amplifier is only required to power the IP voice circuits and the subscriber's telephone hand set.

3 Claims, 3 Drawing Sheets

SYSTEM TO PROVIDE LIFELINE IP TELEPHONY SERVICE ON CABLE ACCESS NETWORKS

CROSS-REFERENCES TO RELATED APPLICATIONS

The invention disclosed herein is related to the copending U.S. patent application Ser. No. 09/197,170, filed Nov. 20, 1998, entitled "A System And Method To Provide Survivability For Broadcast Video And Interactive IP-Based Services On Cable Access Networks" by V. K. Bhagavath and Joseph T. O'Neil, assigned to AT&T Corp. and incorporated herein by reference.

The invention disclosed herein is also related to U.S. Pat. No. 5,457,414 entitled "Power Supply Loss Sensor" by David A. Inglis and Hyun Lee, assigned to AT&T Corp. and incorporated herein by reference.

BACKGROUND OF THE INVENTION

1. Field of the Invention

The invention disclosed is broadly related to telecommunications and is more particularly related to systems and methods to provide telephony for cable access networks.

2. Prior Art

Broadband access networks (e.g., hybrid fiber/coaxial) are used to provide television programming and Internet access for customers. More recently they are being investigated to provide IP telephony service. However, the reliability of hybrid fiber/coaxial (HFC) cable networks is not comparable to the high reliability of the local telephone network. Local telephone networks are designed to meet an unavailability objective of 53 minutes/year/line. HFC cable networks have a downtime of 622 minutes/year/line due to AC power failure and additional 125 minutes/year/line due to failures other than AC power failure (e.g., amplifier failure, water leakage, cable cuts). One key difference between a local loop network and an HFC cable network is that the former uses battery power at the central office. The latter requires voltage from the coaxial cable are sources of power for the DC voltage applied to the IP voice circuits. A power outage sensor selectively connects the IP voice circuits to either the AC/DC power converter and regulator in the modem or, alternately, the DC voltage from the coaxial cable, depending on whether there is an outage sensed at the cable data modem. The other circuits such as the video/audio receiver circuits and IP data transceiver circuits are powered only by the AC/DC power converter and regulator in the cable data modem. In this manner, if there is a general power outage affecting both the trunk amplifier and many of the cable data modems connected to it, the power to be supplied by the backup battery at the trunk amplifier is only required to power the IP voice circuits and the subscriber's telephone hand set. The invention is a cost-effective solution to providing uninterruptible telephone service on an HFC cable network, in the face of power outages anywhere from the cable network headend to the subscriber's telephone.

DESCRIPTION OF THE PREFERRED EMBODIMENTS

Figure 1:
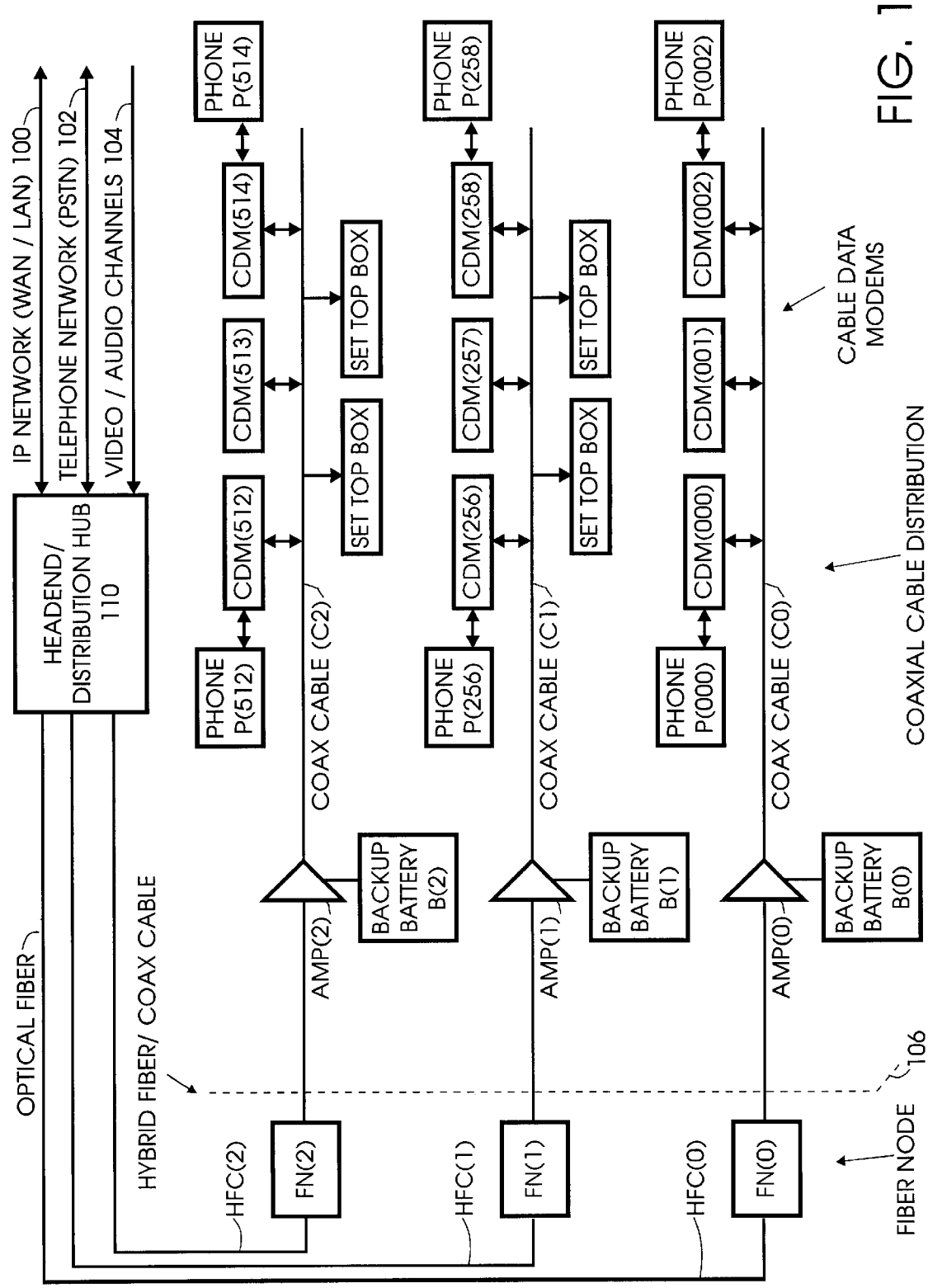
FIG. 1 is an overall network diagram of a cable access network, in accordance with the invention.

The communications network topology, in accordance with the invention, is shown in the network diagram of FIG. 1. The headend or distribution hub 110 is connected to an Internet Protocol Network which can be either a wide area network or a local area network 100. The external network 100 can have a network layer such as IP, IPX, X.25, or AppleTalk on top of an appropriate link layer or it can solely have a link layer such as Ethernet, ATM, FDDI, token ring, IEEE 802.3, or IEEE 802.12. It is also connected to a telephone network which can either be the public switched telephone network or a private telephone network 102. It is also connected to a source of video channels and FM audio channels 104. Two standards for the transmission of data over cable networks are: (1) The IEEE 802.14 Cable-TV Access Method and Physical Layer Specification; and (2) The ITU Standard J112 Data over Cable Service Interface Specification (DOCSIS). These standards define modulation and protocols for high-speed bi-directional data transmissions over cable.

The headend or distribution hub 110 functions to distribute these signals over the hybrid fiber/coaxial cable (HFC) network to cable data modems (CDM) connected to respective coaxial cable distribution paths in the network. The hybrid fiber/coax cable network shown in FIG. 1 extends to the modems CDM, and includes the headend as well as the cables. Each hybrid fiber/coaxial cable, for example HFC (0), includes an optical fiber component connected to the headend 110 which goes through the fiber node FN(0) optical to electrical transducer and through an interface 106 into the coaxial cable distribution portion of the network which consists of a trunk amplifier AMP(0), for example, which delivers over coaxial cable C(0), for example, the electrical analog of the optical signals in the optical fiber portion of the cable. The electrical signals are exchanged with respective cable data modems, CDM(002), for example, as shown in FIG. 1. Cable data modem CDM(002), for example, is shown connected to a conventional telephone hand set P(002). The hybrid fiber/coaxial cable connected to the headend 110 provides connectivity for many cable data modems in a neighborhood or community, in the conventional manner. The trunk amplifier AMP(0), for example, has a backup battery B(0), for example, which can be a lead-acid battery, a solar cell battery, a fuel cell battery, or the like. The battery B(0) must be able to supply sufficient backup power during a power outage at the trunk amplifier to deliver DC power to those IP voice circuits in use during the outage. For example, let the average DC power consumption of the IP voice circuits in one cable data modem be 10 watts. Further, let there be 100 cable data modems connected to the trunk amplifier. Still further, let there be no more than 25 telephone subscribers that need to use their telephone during a power outage. Then, the electrical power required from the backup battery at the trunk amplifier is 250 watts. A conventional 105 amp-hour lead-acid battery can deliver a sufficient amount of backup power for a period of five hours, for this example.

When a cable's connection to the headend 110 is accidentally interrupted—for example, by the loss of electrical power to the amplifier AMP(0) or to the cable data modems CDM(002)—service can be rapidly restored to the affected cable data modems attached to the cable, by means of the invention disclosed herein.

Figure 2:
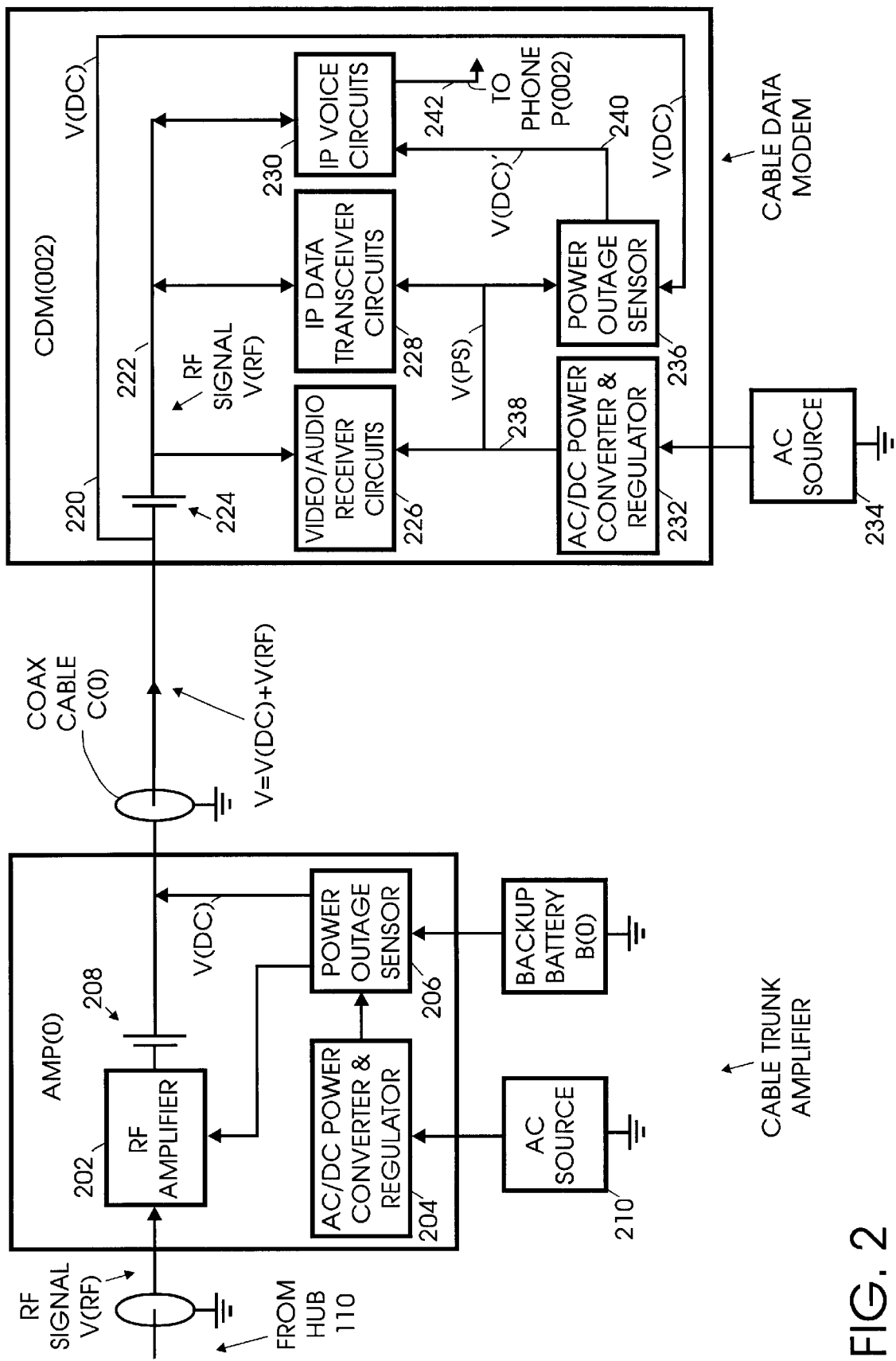
FIG. 2 is a functional block diagram of the cable trunk amplifier and the cable data modem, in accordance with the invention.

FIG. 2 is a functional block diagram of the cable trunk amplifier and the cable data modem, in accordance with the invention. In accordance with the invention, the cable access network includes the cable trunk amplifier AMP(0), connected over the coaxial cable C(0) to a plurality of cable data modems including modem CDM(002), to provide backup power to the cable modems during power outages experienced by either the trunk amplifier or the modems, thereby insuring uninterruptible IP telephone service. Cable data modem CDM(002) is connected to a conventional telephone hand set P(002), which also derives its power from the modem.

The trunk amplifier AMP(0) applies a DC voltage V(DC) across the conductors of the coaxial cable C(0). An AC/DC power converter and regulator 204 connected to AC source 210 and also a backup battery B(0) are sources of power for the DC voltage V(DC) applied to the coaxial cable C(0). A power outage sensor 206 selectively connects either the AC/DC power converter and regulator 204 or, alternately, the backup battery B(0) to the cable C(0), depending on whether there is an outage sensed at the trunk amplifier AMP(0). The RF amplifier 202 in the trunk amplifier AMP(0) amplifies the RF signal V(RF) from the headend, which is coupled across the line capacitor 208 to the coaxial cable C(0) connected to the cable modem CDM(002). The resulting voltage signal on the cable C(0) is the sum V(DC)+V(RF), which is provided to the cable data modem CDM(002).

In accordance with the invention, each cable data modem CDM(002) connected to the trunk amplifier AMP(0) is partitioned into IP voice circuits 230 and other circuits not contributing to the IP voice function. The other circuits include, for example, video/audio receiver circuits 226 and IP data transceiver circuits 228. The IP voice circuits 230 are connected to the subscriber's telephone hand set P(002) on line 242. The cable data modem CMD(002) applies a DC voltage V(DC)' to the IP voice circuits 230 and the subscriber's telephone hand set P(002). The line capacitor 224 couples the RF signal V(RF) signal from the cable C(0) to line 222 to the video/audio receiver circuits 226, the IP data transceiver circuits 228, and the IP voice circuits 230. The line 220 provides the V(DC) voltage from the cable C(0) over line 220 to power outage sensor 236 for the IP voice circuits 230. An AC/DC power converter and regulator 232 in the modem CDM(002) supplied by AC source 234 and also the DC voltage V(DC) from the coaxial cable C(0) are sources of power for the DC voltage V(DC)' applied to the IP voice circuits 230. The power outage sensor 236 selectively connects the IP voice circuits 230 to either the AC/DC power converter and regulator 232 over line 238 in the modem CDM(002) or, alternately, the DC voltage V(DC) from the coaxial cable C(0) over line 240, depending on whether there is an outage sensed at the cable data modem CDM(002). The other circuits such as the video/audio receiver circuits 226 and IP data transceiver circuits 228 are powered only by the AC/DC power converter and regulator 232 voltage V(PS) in the cable data modem CDM(002). In this manner, if there is a general power outage affecting both the trunk amplifier AMP(0) and many of the cable data modems connected to it, the power to be supplied by the backup battery B(0) at the trunk amplifier is only required to power the IP voice circuits 230 and the subscriber's telephone hand set P(002). The invention is a cost-effective solution to providing uninterruptible telephone service on an HFC cable network, in the face of power outages anywhere from the cable network headend to the subscriber's telephone.

Figure 3:
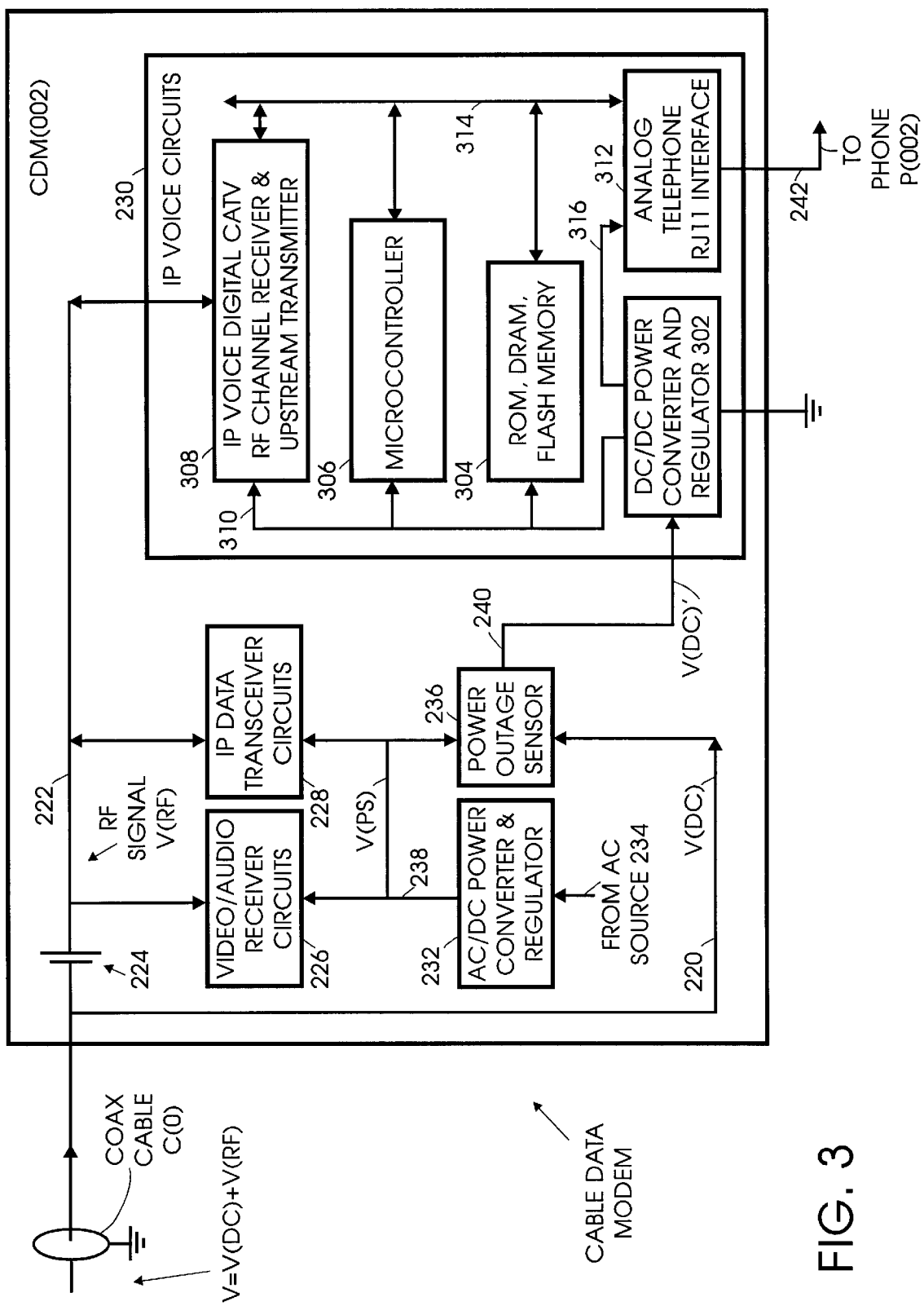
FIG. 3 is a more detailed functional block diagram of the cable data modem, in accordance with the invention.

FIG. 3 is a more detailed functional block diagram of the cable data modem, in accordance with the invention. The figure shows the details of the IP voice circuits 230, which include the DC/DC power converter and regulator 302 that receives the voltage V(DC)' over line 240 from the power outage sensor 236. The DC/DC power converter and regulator 302 supplies 210 DC voltage to the ROM, DRAM, Flash memory 304, the microcontroller 306, the IP voice digital CATV RF channel receiver and upstream transmitter 308 over line 310. The DC/DC power converter and regulator 302 also supplies DC voltage to the analog telephone RJ11 interface 312 that connects over line 242 to the telephone hand set P(002). Bus 314 distributes voice signals between the ROM, DRAM, Flash memory 304, the microcontroller 306, the IP voice digital CATV RF channel receiver and upstream transmitter 308, and the analog telephone RJ11 interface 312.

Two examples of the power outage sensor 206 in the trunk amplifier AMP(0) and the power outage sensor 236 in the cable data modem CDM(002) are given in the above-referenced U.S. Pat. No. 5,457,414 entitled "Power Supply Loss Sensor" by David A. Inglis and Hyun Lee, assigned to the AT&T CORP and incorporated herein by reference. In FIG. 8 of Inglis, et al., data corruption or system malfunction due to loss of the primary DC power supply is commonly prevented by using a "diode-switch" method. The Inglis et al. FIG. 8 shows two diodes external to the system device (e.g., an integrated circuit), and connected so that one diode is reverse biased while the other diode is forward biased. This type of solution is acceptable if the V(PS) voltage level is high enough so that a diode voltage drop will still provide a solid power supply voltage V(DC) to the system, which is usually true if the V(PS) is 5 V (plus or minus 10 percent). However, in the case of V(PS) being 3 V (plus or minus 5 percent) for powering an integrated circuit, using the method of the Inglis et al. FIG. 8 results in a voltage range of only 2.2 V to 2.5 V (i.e., V(PS) minus the diode voltage drop). This level of power supply voltage (2.2 V to 2.5 V) may degrade the performance of a logic circuit to a point which is not acceptable. For example, the speed degradation due to the lowering of the power supply from 3 V to 2.2 V is typically a factor of 2. Inglis et al. disclose another power supply loss sensor in greater detail. The second Power Supply Loss Sensor circuit shown in the Inglis et al. FIGS. 1–7 detects the loss of a power supply voltage in a system that includes a primary and a backup power supply. One or both of the power sources are typically batteries; for example, a rechargeable battery may be the primary power source, and a long-life battery (e.g., lithium or alkaline) may be the backup, with other power sources being possible. The loss sensor detects a gradual degradation or total loss of V(PS), the primary power supply to the system. Either the primary power supply or the backup power supply can be removed from the system at any time and the circuit will maintain power to a selected portion of a system, using the remaining power supply. The loss sensor circuit is designed with all-digital logic or equivalent low power components, thus minimizing power dissipation and increasing its versatility. That is, this circuit can be fabricated with either a digital or analog integrated circuit fabrication process.

The invention is a cost-effective solution to providing uninterruptible telephone service on an HFC cable network, in the face of power outages anywhere from the cable network headend to the subscriber's telephone.

Various illustrative examples of the invention have been described in detail. In addition, however, many modifications and changes can be made to these examples without departing from the nature and spirit of the invention.

What is claimed is:

1. A cable access network, comprising:

a cable trunk amplifier connected over a coaxial cable to A plurality of cable data modems;

a main power source and a backup power source in said cable trunk amplifier for applying a DC voltage to the coaxial cable;

a power outage sensor in said cable trunk amplifier that selectively connects either the main power source or the backup power source to the cable, depending on whether there is an outage sensed at the trunk amplifier;

at least one cable data modem connected to the trunk amplifier, said modem being partitioned into IP voice circuits and other circuits not contributing to an IP voice function;

a local main power source in the modem and the DC voltage from the coaxial cable for providing sources of power for the IP voice circuits; and a local power outage sensor in the modem for selectively connecting the IP voice circuits to either the local main power source or the DC voltage from the coaxial cable, depending on whether there is an outage sensed at the cable data modem.

2. The cable access network of claim 1, which further comprises:

said IP voice circuits connected to a subscriber's telephone hand set which is powered by the cable data modem.

3. The cable access network of claim 1, which further comprises:

said other circuits including video/audio receiver circuits and IP data transceiver circuits.

* * * * *